J. RANKIN.
Churn.
No. 53,335.
Patented March 20, 1866.
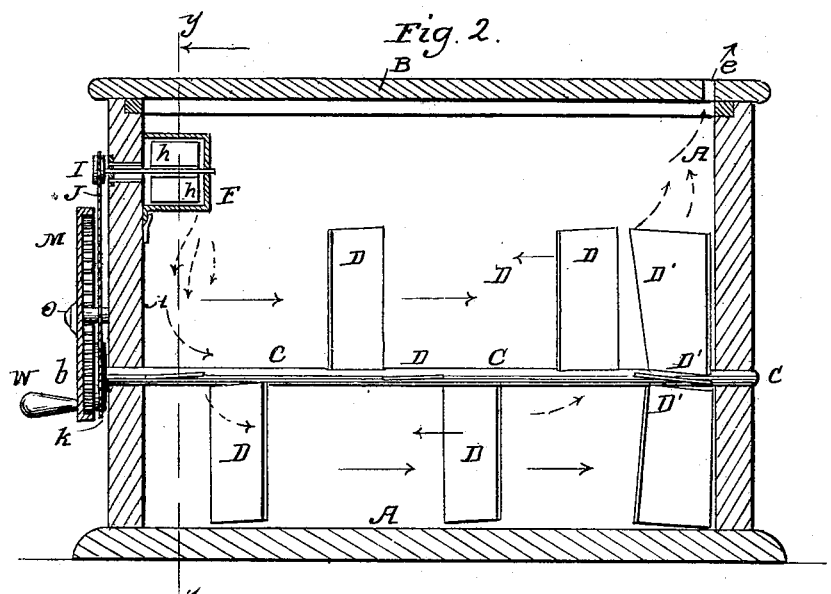
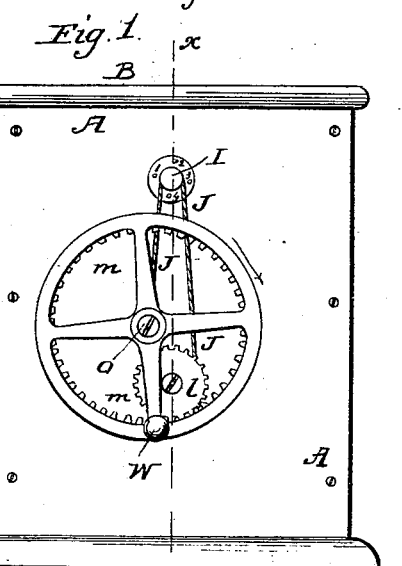
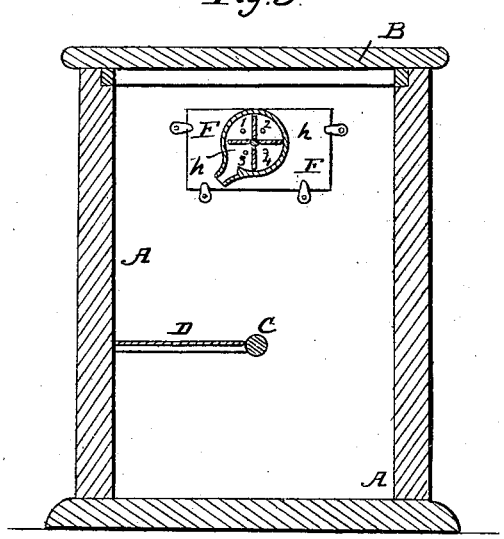
Witnesses:
Charles Speer
John Todd
Inventor:
John Rankin
By his attorney
J. N. McIntire

UNITED STATES PATENT OFFICE.

JOHN RANKIN, OF NEW YORK, N. Y.

IMPROVEMENT IN CHURNS.

Specification forming part of Letters Patent No. 53,335, dated March 20, 1866.

*To all whom it may concern:*

Be it known that I, JOHN RANKIN, of New York, New York county, in the State of New York, have invented certain new and useful Improvements in Churns; and I do hereby declare that the following is a full and exact description thereof, reference being had to the accompanying drawings, making part of this application.

My invention has for its objects to produce a churn which shall be exceedingly simple and durable in its construction, and which shall churn butter faster and with less labor than those now in use; and to these ends my invention consists in a churn constructed and operating essentially as hereinafter more fully explained.

To enable those skilled in the art to make and use my invention, I will proceed to describe its construction and operation, referring by letters to the accompanying drawings, forming part of this application, in which—

Figure 1 is an end elevation of my improved churn. Fig. 2 is a vertical longitudinal section at the line $xx$ of Fig. 1; and Fig. 3 is a vertical cross-section at the line $yy$ of Fig. 2.

In the several figures the same part is indicated by the same letter of reference.

A is the box or case of the churn, which I have represented of a rectangular shape, though its form may be varied without departing from the spirit of my invention.

B is the lid or case-top, which should be provided with a vent-hole, $e$, for the escape of the air forced in, as will be presently explained.

C is the dasher-shaft, which is arranged longitudinally in the box or case A, in the manner shown. It is mounted to turn freely in suitable journal-boxes, one in each end of said case A, and is furnished at one end with a spur-pinion, $l$, (see Figs. 1 and 2,) which meshes into and is driven by the main driving-gear $m$. This latter gear is an internal rim gear, constructed as shown, and provided with a suitable handle, W, by means of which the operator works the machine.

$k$ is a band wheel or pulley, which is secured on shaft C, and from which passes a cord or belt, J, to drive the small pulley I, which latter is secured on and rotates the fan-shaft. The said shaft is, as clearly seen at Fig. 2, arranged immediately over the geared end of the dasher-shaft C. It passes through the end of box A, as shown, and runs through the fan-case F, and is furnished with suitable vanes or wings $h$.

The case F, I propose to make of sheet metal and secure to the inner surface of the end of box A, as shown, or in any other desirable manner. Said case should be so constructed as to cause the blast to discharge downward, near to the end of the box, as indicated by blue arrows at Fig. 2, and should be formed with a lifting lid or cover, F', provided with a suitable catch or fastening, $g$, as shown.

The air is supplied to the fan through four (more or less) holes, 1 2 3 4, made in the end of the case A.

Upon the dasher-shaft C are arranged, in helical or screw form, numerous blades or dashers, D, extending along on said shaft from its geared end (the end nearest pinion $l$) to near its opposite end, at which last-named portion of said shaft are arranged four dashers, D', similar in form and size to the others, D, but being so arranged on the shaft C as to screw or feed the reverse way to those marked D— that is to say, the dashers D are all so formed and arranged as to screw or feed the contents of the churn away from the geared end of shaft C when said shaft is rotated in the direction of the arrow at Fig. 1, as illustrated by the black arrows at Fig. 2, while the dashers marked D' have the tendency to reverse the direction of feed and throw the material suddenly back again. This combination of the two feeds, as shown, it will be seen, will not only cause a great agitation of the cream near the dashers D', but will also have a tendency to create a ready means for the escape of the blast, as well as induce to a perfect commingling of the blast with all the particles of cream and butter.

It will be seen that by the arrangement of the fan-blower within the case A, as shown, and providing the induction air-passages 1 2 3 4, a very simple, effective means is afforded for supplying the blast, while at the same time the whole structure is economic and easily cleaned.

It will be observed that the arrangement of driving machinery is exceedingly compact, cheap, and durable, and that it is all attached to the one end piece of the box or case A.

Having fully explained the construction of the several parts and their arrangement together, a few words will suffice to make clear the general operation of my new churn to those skilled in the art.

The case or box A being supplied with the proper quantity of cream the operator turns the main driving-wheel $m$, by means of its handle W, in the direction indicated by the arrows at Fig. 1, whereby the dasher-shaft C, with its two sets of blades, D and D', is rapidly rotated and the fan $h$ driven at a much greater velocity. As the several parts continue their respective motions the mass of cream is alternately fed along by the blades D and suddenly checked and reversed by the blades D'. Meanwhile the fan-blower receives a constant supply of air through the holes 1 2 3 4, and discharges a constant blast of air in the direction indicated by the blue arrows at Fig. 2, which commingles with and passes along in contact with the mass of cream, making its escape upward again and out at the vent-hole $e$.

The working of the butter is performed, if desired, by the motion of the dashers worked at the discretion of the operator.

What I claim as new, and desire to secure by Letters Patent, is—

1. The employment of a dasher having its paddles or beaters constructed and arranged in the manner specified—that is to say, with all except one set to screw or feed the cream toward one end of the box, and one set at said end to screw or feed in a reverse direction, as hereinbefore set forth.

2. The main driving-gear $m$, pinion $l$, pulley $k$, fan-pulley I, and belt J, the whole combined and arranged to operate in the manner specified.

3. The employment of a blower arranged within the case of the churn and in conjunction with induction-holes 1 2 3 4, substantially as and for the purposes set forth.

4. The employment of the double-screw dash, constructed in the manner specified, in combination with the blower and air-escape $e$, when the said blower is located at one end and the exit $e$ at the other end of the box, the whole operating in the manner and for the purposes set forth.

In testimony whereof I have hereunto set my hand and seal.

JNO. RANKIN. [L. S.]

In presence of—
ANDREW I. TODD,
J. N. McINTIRE.